United States Patent [19]

Bernstein

[11] Patent Number: 4,703,349

[45] Date of Patent: Oct. 27, 1987

[54] METHOD AND APPARATUS FOR MULTI-DIMENSIONAL SIGNAL PROCESSING USING A SHORT-SPACE FOURIER TRANSFORM

[75] Inventor: Jeffrey G. Bernstein, Lynn, Mass.

[73] Assignee: PictureTel Corporation, Peabody, Mass.

[21] Appl. No.: 713,478

[22] Filed: Mar. 19, 1985

[51] Int. Cl.$^4$ .................. H04N 7/12; H04N 1/40; G06F 7/34; G06F 15/332
[52] U.S. Cl. .................. 358/133; 358/260; 364/726; 382/43; 382/56
[58] Field of Search .................. 358/133, 138, 260; 364/514, 725, 726; 382/43, 56

[56] References Cited

U.S. PATENT DOCUMENTS

| | | | |
|---|---|---|---|
| 4,189,748 | 2/1980 | Reis | 358/133 |
| 4,196,448 | 4/1980 | Whitehouse et al. | 364/725 X |
| 4,245,248 | 1/1981 | Netravali et al. | 358/136 |
| 4,281,344 | 7/1981 | Mounts et al. | 358/136 |
| 4,302,775 | 11/1981 | Widergren et al. | 358/136 |
| 4,394,774 | 7/1983 | Widergren et al. | 382/56 |
| 4,447,886 | 5/1984 | Meeker | 364/725 |
| 4,504,860 | 3/1985 | Nicol et al. | 358/133 |
| 4,606,004 | 8/1986 | Crawford et al. | 382/43 X |

OTHER PUBLICATIONS

Jain et al., "Displacement Measurement and Its Application in Interframe Image Coding," *IEEE Transactions on Communications*, vol. COM-29, No. 12, Dec. 1981, pp. 1799–1808.

Koga et al., "Motion-Compensated Interframe Coding for Video Conferencing," CH1679-0/81/0000-0312, 1981 IEEE, G5.3.1–G5.3.5.

Ericsson, "Motion-Compensation Hybrid Coding at 50 Kb/s," CH2118-8/85/0000-0367, 1985 IEEE, 10.8.1–10.8.8, pp. 367–370.

Reeve III et al., "Reduction of Blocking Effect in Image Coding," CH1841-6/83/0000-1212, ICASSP 83, Boston, pp. 1212–1215, (1983).

GTE Advertisement, "The Uses of Silence," *Technology Review*, Aug./Sep., 1984, pp. 64–65.

Hinman et al., "Short-Space Fourier Transform Image Processing," Massachusetts Institute of Technology, Research Laboratory of Electronics, Cambridge, Mass.

*Primary Examiner*—E. A. Goldberg
*Assistant Examiner*—Patrick W. Foster
*Attorney, Agent, or Firm*—Lahive & Cockfield

[57] ABSTRACT

A method and apparatus for representing a multi-dimensional, finite extent, information containing signal in a locally sensitive, frequency domain representation employs transforming the digital signal using a Short-Space Fourier transform having overlapping basis functions. The theory and application of the Short-Space Fourier transform provide, in one particular application of picture image transmission, an improved image quality over previously employed block transform coding methods and apparatus. A particularly preferred window function for use in connection with image signal processing is the multi-dimensional sinc function which has the unique advantage of a rectangular bandpass signal in the frequency domain.

40 Claims, 10 Drawing Figures

METHOD AND APPARATUS FOR MULTI-DIMENSIONAL SIGNAL PROCESSING USING A SHORT-SPACE FOURIER TRANSFORM

The invention relates generally to a multi-dimensional signal processing method and apparatus and in particular to a method and apparatus useful for processing finite extent, multi-dimensional signals such as, for example, two-dimensional pictorial images.

There are many applications in which it is desired to obtain the spectrum of a discrete, finite extent, multi-dimensional signal. For infinite extent signals, the multi-dimensional discrete Fourier transform has long been an important tool. In some situations, however, such as image processing, the multi-dimensional signals are not stationary. Consequently, it is desirable to obtain a spectrum which reflects localized characteristics of the signal. One method for obtaining such a representation is to divide the image into an arbitrary number of sections and to perform a discrete Fourier transform on each section.

This method has been employed with numerous variations; however, by performing a multi-dimensional discrete Fourier transform over a finite signal section, extraneous spectral energy is often introduced to account for the abrupt transitions which can occur across opposite boundaries of the signal. In image coding applications, the problem is avoided, somewhat, by using the discrete cosine transform (DCT). However, a solution of more general application is to pass the signal through a bank of bandpass filters and to periodicaly sample the outputs.

For the one-dimensional, infinite duration signal, this technique is often referred to as a "short-time Fourier transform." Several authors have described the theory of the short-time Fourier transform analysis in considerable detail. Thus, for a one-dimensional, infinite duration discrete signal, X(n), the short-time Fourier transform has been defined as:

$$X(n,\omega) = \sum_{m=-\infty}^{\infty} x(m)w(n - m)e^{-j\omega t} \quad \text{(Equation 1)}$$

where w is a window function used for localization of the signal. This definition can be generalized to include multi-dimensional signal functions of infinite extent. If, however, the generalization of the short-time Fourier transform of Equation 1 were applied to a signal defined over a finite region, for example by padding the signal with zero's outside it's region of support, two problems immediately arise. First, the non-zero portion of the transform in the spatial direction may extend well beyond the bounds of the input function; and second, artificial discontinuities can be introduced at the signal boundaries. Such discontinuities will introduce extraneous information in the spectral domain which can obscure the true spectral characteristics of the signal.

This is particularly pertinent to the field of image data processing and compression. Image data compression is a process which allows images to be transmitted over a communications channel using fewer bits of data than required to transmit an uncoded image. By reducing the quantity of data that is transmitted, the received picture is generally degraded in quality from the original; and the goal of a particular image data compression method and apparatus is to minimize the amount of degradation that occurs for a given data rate. One well known compression method is transform coding. This method involves taking a transformation of the image data to provide a sequence of coefficients which can be encoded using, for example, a non-equal number of bits for each resulting coefficient. In particular, the number of bits employed is based upon the logarithm of the variance for a particular coefficient. At the receiver, the coded coefficient data is employed for reconstructing the coefficient values and performing the inverse of the original transform to obtain an image representative of the original data.

In accordance with transform coding, and to account for localized variations in image characteristics, the transforms are taken over small rectangular regions (blocks) of the image rather than over the entire image. This is often called block transform coding. The major disadvantage of this method is that as the image is degraded by the coding process, the boundaries of the blocks can be clearly visible in the resulting received image. In particular, this occurs because in accordance with traditional block transform coding, the quantization noise is generally correlated within blocks but is independent between blocks. As a result, coded images appear to be composed of "tiles".

Varous attempts have been made in the past to reduce the visibility of the block boundaries (often called the "blocking effect") in block transform coding methods. One method involves the use of blocks which overlap, by one picture element, along each boundary. This method has the disadvantage that overall coding performance suffers since extra redundancy is introduced by the overlapping data. Another method involves the use of a post-filtering process on the reconstructed image. The filter is employed to blur the received image only along the block boundaries and has the disadvantage that details in the image which happened to fall at the boundaries are also blurred. Yet another method involves subtracting, prior to coding, a smooth low pass version of the image which largely accounts for the image energy at the block boundaries. The resulting degradation in block boundaries is reduced, thus reducing the visibility of the boundaries. None of the methods previously employed in connection with block transform coding, however, results in an elimination of the visibility of the blocking effect.

It is therefore an object of the invention to extend the infinite extent, one-dimensional, short-time Fourier transform, to a finite extent, multi-dimensional, Short-Space Fourier transform and to provide an efficient, advantageous implementation of the Short-Space Fourier transform. Another object of the invention is a particularly advantageous Short-Space Fourier transform for eliminating the "blocking effect" phenomenon in connection with block transform coding. Other objects of the invention are reliable, efficient, image data compression apparatus and methods for reducing the data bandwidth required for efficient, practical image transmission over dedicated or other telephone lines. Further objects of the invention are efficient and practical multi-dimensional filter and power spectrum estimation methods and apparatus, improved image coding methods and apparatus, and improved image restoration methods and apparatus.

SUMMARY OF THE INVENTION

Most generally, the invention relates to a method and apparatus for representing a multi-dimensional, finite extent, information containing signal in a locally sensitive, frequency domain representation. The method features transforming the digital representation of the information containing signal, using a Short-Space Fourier transform having overlapping basis functions. In a particular embodiment, the transforming step further features the step of critically sampling the information containing signal, and selecting a window function for use in the Short-Space Fourier transform for which an inverse window function, that is, the synthesis function, can be generated.

In a particular application of the Short-Space Fourier transform, the invention relates to a method and apparatus for representing a pictorial image. The method features transforming a digital representation of the image, using a Short-Space Fourier transform having overlapping basis functions, for generating a compacted digital representation of the image. The compacted digital representation requires fewer bits of data than the digital representation for representing the image. The transforming step features effecting a discrete Fourier transform of a reflectively extended representation of the digital representation of the image for generating a discrete, reflected, transform image representation. The method further features multiplying the discrete, reflected, transform image representation by a windowing function for generating a block-windowed transform image representation of the image and effecting an inverse discrete Fourier transform of the block-windowed transform image representation for generating an unquantized, inverse transform representation of the image. Thereafter, the method features quantizing the coefficients of the inverse transform representation of the image for generating the compacted digital representation which can then be, for example, transmitted over a data communications line.

The first Fourier transform step, according to a preferred implementation of the invention, features the step of employing the discrete cosine transform operating on the digital representation of the image for generating the discrete reflected transform image representation. When the discrete cosine Fourier transform is employed, the multiplying step features scaling the multiplication by a factor for compensating for the discrete cosine transform and adjusting the phase wrap of the multiplication method for compensating for a phase shift requirement of the discrete cosine transform.

When the compacted digital representation is transmitted over a data communications line, the method further features, at the receiving location, transforming the received image representation using an inverse Short-Space Fourier transform for generating a received inverse transform representation representative of the image, and thereafter preferably, displaying the received inverse transform representation of the image. The receiver transforming step can feature effecting a discrete Fourier transform of the received image representation for generating a received, block-windowed image representation; multiplying the received, block-windowed image representation by a synthesizing function for generating a received discrete reflected transform image representation, and thereafter effecting an inverse discrete Fourier transform of the received discrete reflected transform representation for generating the received inverse transform representative of the image.

In another aspect, the apparatus for representing a pictorial image features electrical elements for transforming a digital representation of the image using a Short-Space Fourier transform having overlapping basis functions for generating a compacted representation of the image. Thereby, the compacted representation requires fewer bits of data than the digital representation for representing the image. In particular, the transforming element has elements for effecting a discrete Fourier transform of a reflectively extended representation of the digital representation of the image for generating a discrete reflected transform image representation. Further elements provide multiplication of the discrete reflected transform image representation by a windowing function for generating a block-windowed transform image representation and other elements effect an inverse discrete Fourier transform of the block-windowed image representation of the image for generating an unquanitized, inverse transform representation of the image. Thereafter a quantizer operates upon the inverse transform representation of the image for generating the compacted representation which can be transmitted to a receiving location. At the receiving location, apparatus is provided for reversing the various steps enumerated above to recover a representation of the original image.

The Short-Space Fourier transform can be advantageously employed in connection with applications other than image processing for data storage or communications. Thus, the Short-Space Fourier transform can be advantageously employed as a multi-dimensional filter, for example, for spectral estimation in connection with power spectrum estimation. The transform can further be employed, in this connection, in the radar and acoustics fields, for example, for finding peaks in a radar system. The Short-Space Fourier transform can also be applied to image coding and image restoration to advantageously improve the results obtainable in those fields.

BRIEF DESCRIPTION OF THE DRAWINGS

Other objects, features, and advantages of the invention will be apparent from the following description taken together with the figures in which.

DESCRIPTION OF PREFERRED PARTICULAR EMBODIMENTS

The short-time Fourier transform noted above is equivalent to performing a series of Fourier transforms of a signal to be analyzed multiplied by a window function. The window function effectively localizes the signal around successive central points. The critically sampled short-time Fourier transform of a discretely sampled, infinite extent, multi-dimensional signal, x, can be derived from Equation 1 and equals:

$$X(Rn, \Omega k) = \sum_{m=-\infty}^{\infty} x(m) w(Rn - m) \exp(-jk\Omega m) \quad \text{(Equation 2)}$$

where the two-dimensional function "X" is the short-time Fourier transform of x, where R is the sampling factor in the time dimension, $\Omega$ is the sampling factor in the frequency domain, and $\Omega$ is related to R, for a critically sampled signal, by the equation:

$$\Omega = 2\pi/R \quad \text{(Equation 3)}$$

The Short-Space Fourier transform is a multi-dimensional extension of the short-time Fourier transform which takes into account the finite extent of the signal being transformed. It is this modification of the short-time Fourier transform which allows the Short-Space Fourier transform to be advantageously employed in connection with, for example, image bandwidth compression. The modification of the short-time Fourier transform is described in detail in the Master's degree thesis of the inventor, J. G. Bernstein, and is entitled "Properties and Applications of the Short-Space Fourier Transform." The thesis was submitted to the Department of Electrical Engineering and Computer Science at the Massachusetts Institute of Technology. The detailed basis of the Short-Space Fourier transform, including the theory and derivation thereof, can be found in the Bernstein thesis. The following outline derivation of the Short-Space Fourier transform, and its practical and advantageous implementation, relate directly to the detailed theory of the Berstein thesis.

The modification of the short-time Fourier transform to a finite size signal is dependent upon the manner in which the signal is conceptually extended to allow the use of infinite length transforms to be computed on the window function. Further, to be useful for image compression applications, the number of non-redundant coefficients resulting from the transform operation must not be increased by the method and apparatus. For this condition to hold, the transform must operate upon a periodic extension of the signal being operated upon.

It is well known in connection with the transform coding of images, that a periodic extension of an image block causes discontinuities at the image boundaries which will severely degrade coding performance due to added high frequency content which is thus introduced. An alternative which can result in a non-redundant representation and which also avoids boundary discontinuities, is to reflectively extend the signal in each dimension. Reflective extension of a signal involves the periodic extension of a signal wherein the signal is reversed in each dimension (direction) such that each successive period of the signal looks as though it were reflected through a mirror for each dimension. A graphic illustration of this type of extension is illustrated in FIG. 1.

Figure 1:
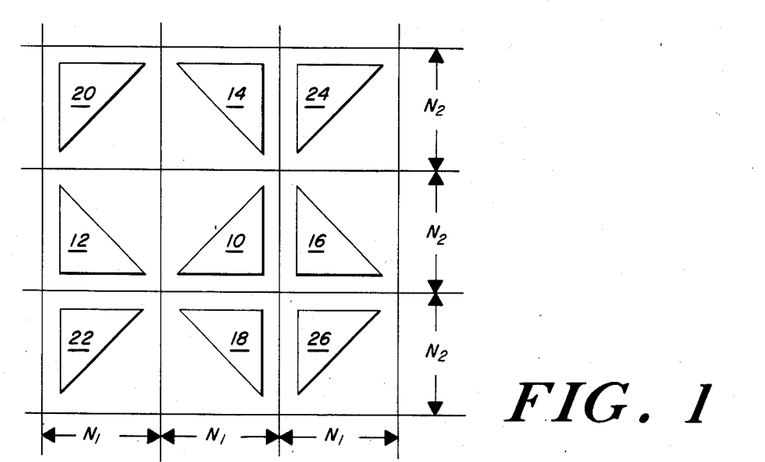
FIG. 1 is a diagrammatic representation of a reflectively extended two-dimensional signal.

Thus, referring to FIG. 1, an original image 10 is reflected about a horizontal or vertical axis, for this two-dimensional case, into images 12, 14, 16, and 18. Correspondingly, image 12 is reflected into images 20 and 22, and image 16 is reflected into images 24 and 26. The images 20, 22, 24, and 24 can also be generated in a consistent manner by reflectively extending images 14 and 18 about respective vertical axes.

To ensure that the reflective extension of a signal results in a non-redundant representation, slight restrictions must be placed upon the window function which is employed in the transform. These restrictions, (and others,) are discussed in Section 4.2 of the Bernstein thesis. Here, however, it is simply noted that a large number of window functions will satisfy the various restrictons placed thereon, and that one, in particular, a window function of the general form (sin x)/x, is most useful for image coding applications. It is the Short-Space Fourier transform using this particular window function to which the remainder of the discussion herein will be directed. The Bernstein thesis however provides much more general description and discussion of this and other window functions.

Using reflective extension, extending the short-time Fourier transform to multiple dimensions, and limiting the transform to an extent of "2 N" as defined hereinafter, the critically sampled, Short-Space Fourier transform and its inverse can be expressed as defined in Equations 4–12 as follows:

$$X(R\underline{n}, \Omega \underline{k}) = \sum_{\underline{a} \in D_{2N}} \tilde{x}(\underline{a}) \tilde{w}(R\underline{n} - \underline{a}) \exp(-j\underline{k}^T \Omega \underline{a}) \quad \text{(Equation 4)}$$

$$x(\underline{n}) = \frac{1}{|R|} \sum_{\underline{k} \in D_R} \sum_{\underline{a} \in D_Q} X(R\underline{a}, \Omega \underline{k}) \tilde{f}(\underline{n} - R\underline{a}) \exp(j\underline{k}^T \Omega \underline{n}) \quad \text{(Equation 5)}$$

where:

$$\tilde{x}(\underline{n}) = x(J(\underline{n})) \text{ and} \quad \text{(Equation 6)}$$

$$J_i(\underline{n}) = J_i(n_i) = \begin{cases} n_i & 0 \leq n_i \leq N_i - 1 \\ 2N_i - 1 - n_i & N_i \leq n_i \leq 2N_i - 1 \end{cases}$$

$$\tilde{w}(\underline{n}) = \sum_{\underline{b} \in D_\infty} w(\underline{n} - 2N\underline{b}) \quad \text{(Equation 7)}$$

$$\tilde{f}(\underline{n}) = \sum_{\underline{b} \in D_\infty} f(\underline{n} - 2N\underline{b}) \quad \text{(Equation 8)}$$

and $$\sum_{\underline{a} \in D_Q} \tilde{w}(R\underline{a} - M\underline{r} - \underline{n}) \tilde{f}(\underline{n} - R\underline{a}) = \delta(\underline{r}) \quad \text{(Equation 9)}$$

$$\forall \underline{n}, \underline{r} \in D_Q$$

where, $\tilde{w}$ is the window function, w, spatially aliased over blocks of size 2 N. Similarly, $\tilde{f}$ is the inverse window function, the synthesis function, spatially aliased over blocks of size 2 N. The restriction of Equation 9 is required for the exact reconstruction of the original signal. Similarly, $\tilde{x}$ is the reflectively extended signal $\tilde{x}$ over a block of size 2 N (that is, x includes, for example, images 10, 14, 16, and 24 of FIG. 1). R is the spatial sampling frequency, $\Omega$ is the spectral sampling frequency, and N is the extent of the original signal.

For D dimensional signals, R is a diagonal matrix defined as the spatial sampling matrix, $\Omega$ is a spectral sampling matrix, and N defines the signal size matrix. R, $\Omega$, and N are diagonal matrices whose elements correspond to the size (N), or sample spacing ($\Omega$, R) in the corresponding dimension of the signal. The matrices are represented as:

$$R = \begin{bmatrix} R_1 & & \\ & R_2 & 0 \\ & & \\ 0 & & R_D \end{bmatrix} \quad \text{(Equation 10)}$$

$$\Omega = \begin{bmatrix} \Omega_1 & & \\ & \Omega_2 & 0 \\ & & \\ 0 & & \Omega_D \end{bmatrix} \quad \text{(Equation 11)}$$

$$N = \begin{bmatrix} N_1 & & \\ & N_2 & 0 \\ & & \\ 0 & & N_D \end{bmatrix} \quad \text{(Equation 12)}$$

In the equations above, variables with underscores represent vectors of D dimensions. For images, D=2 and the dimensions correspond to the ordinary X and Y spatial coordinates. The symbols used to represent the regions over which summations are taken are defined as follows:

$D_\infty$ = all $n$ such that $-\infty \geq n_i \geq +\infty$ for all $i$ and $D_{2N}$ = all $n$ such that $0 \leq n_i \leq 2N-1$ for all $i$.

Finally, the relationships between image size and sample spacing, for a critically sampled transform, are given by:

$$Q\,R = 2N \quad \text{(Equation 13)}$$

$$\Omega = 2\pi R^{-1} \quad \text{(Equation 14)}$$

$$\Gamma = 2\pi Q^{-1} \quad \text{(Equation 15)}$$

$$\Psi = 2\pi(2N)^{-1} \quad \text{(Equation 16)}$$

Equation 13 defines Q which determines the dimensional size of the second summation used in Equation 5; Equation 14, the matrix equivalent of Equation 3, defines the condition for critical sampling, and Equations 15 and 16 are employed hereinbelow in connection with a particular preferred window function for use in connection with image coding.

The window function which is most desirable in connection with image coding is, as noted above, of the general form (sin x)/x. This is known as the sinc function. The sinc function is particularly useful because it corresponds, in the frequency domain, to a rectangular window function and has the property that the frequency bands of the resulting Short-Space Fourier transform of a signal are non-overlapping. The non-overlapping condition is particularly desirable for image coding purposes in the spatial domain.

Since the extent of this window function is greater than the spatial sampling spacing R (corresponding to image block size), the resulting basis functions used for the signal (or image) being processed overlap plural sample regions (or blocks). This is true for all basis functions of interest according to the invention. Note that the basis functions defined by a rectangular window function, over a single block in the spatial domain are not-overlapping.

The particular preferred window function, corresponding in the spatial domain to the sinc function, is most easily expressed in the frequency domain. The expression, for a size 2 N discrete Fourier transform of $\tilde{w}$, is $$\tilde{W}(\underline{b}) = \begin{cases} \exp(\mathbf{i}j\,\underline{i}^T(\Gamma - \Psi)\underline{b}) & \underline{b} \in D_Q \\ 0 & \text{otherwise} \end{cases} \quad \text{(Equation 17)}$$

where all of the elements of i are defined to be unity.

Having generally described the Short-Space Fourier transform, it is clear that it is of little practical use unless there is an efficient method for its implementation. Thus, while it is possible to compute the Short-Space Fourier transform, and its inverse, directly from Equations 4-16, using for example the window function of Equation 17, direct computation is impractical because of the large number of operations which must be performed. It is, however, preferable to determine the Short-Space Fourier transform using a method known as the polyphase filter network method.

For the particular window of Equation 17, however, the Short-Space Fourier transform can be determined very efficiently in the frequency domain since the spectral bands are non-overlapping. The method involves first performing a transform on the entire signal to convert it to the frequency domain, and then following the full image transform, performing Fourier transforms over small blocks of the transform signal. Each block is equivalent to a frequency band in one dimension.

Figure 2:
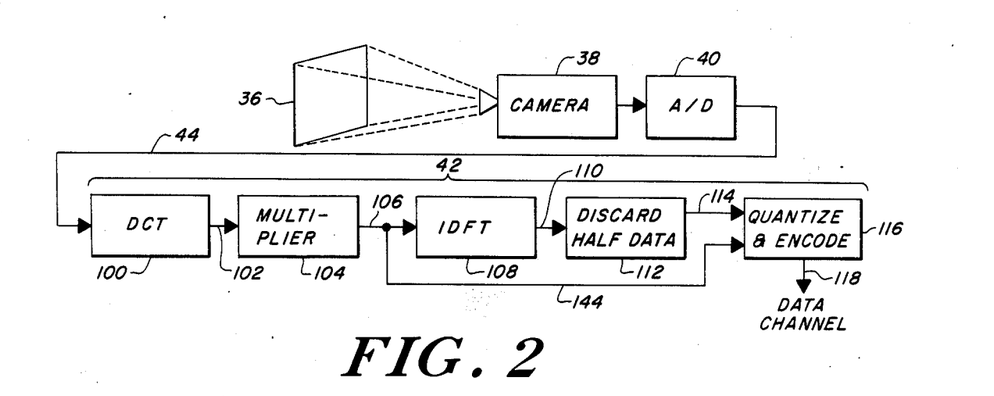
FIG. 2 is an electrical block diagram illustrating a Short-Space Fourier transform image compression apparatus according to the invention.

Referring to FIG. 2, an image 36 recorded by a camera 38 can be digitized by an analog-to-digital converter 40, and the resulting digital representation of the image is directed to an image coding transmitter 42 over lines 44.

The first step of the method is to perform a discrete Fourier transform over the reflectively extended full image of size 2 N, that is, the image reflected once in each direction, thus doubling the size of the "signal" in each dimension. This can be implemented employing the multi-dimensional, discrete Fourier transform. Preferably, however, it is understood that the discrete Fourier transform of a reflectively extended signal is effectively equivalent to the discrete cosine transform of the original signal with the need of a scaling factor for the zero frequency component and a phase wrap adjustment applied to all frequency coefficients. Thus, referring to FIG. 2, a discrete cosine transform (DCT) circuitry 100 receives the digital representation over lines 44 and provides over lines 102 a discrete, reflected transform image representation. There are a number of fast implementations of the discrete cosine transform, and the discrete cosine transform circuitry 100 can operate more efficiently than the fast Fourier transform of double the size in each dimension. (Note that if the Fourier transform approach is employed, only one quadrant of the result is needed for reconstruction. The remaining quadrants can be simply reconstructed from the inversion using the symmetries in the transform domain.) The result of the reflectively extended Fourier transform circuitry over lines 102 is a transform signal which corresponds to dividing the spectrum into blocks or bands. When the discrete cosine transform is used, the spectrum coefficients must be multiplied by a particular phase wrap for proper spatial alignment of the result and the zero frequency coefficient must be properly scaled. These operations, in the preferred embodiment, are combined in a multiplication circuitry 104, in which the frequency domain window function and the signal over lines 102 are multiplied. This multiplication step, provided by circuitry 104, can be expressed as:

$$y(\underline{b},\underline{k}) = \frac{|Q|}{2e(Q\underline{k} + \underline{b})} \exp(j \, \underline{i}^T(\Gamma\underline{b} - \Omega\underline{k})) \cdot X_c(Q\underline{k} + \underline{b}) \quad \text{(Equation 18)}$$

where $$e(\underline{n}) = \prod_{i=1}^{D} E(n_i) \text{ and}$$

$$E(n_i) = \begin{cases} 1/\sqrt{2} & n_i = 0 \\ 1 & n_i \neq 0 \end{cases}$$

Thus, e(n) provides the zero frequency coefficient scaling factor, $X_c$ is the cosine transform, b represents the position within a block, and k represents the block position. The required phase wrap adjustment is included in the exponential function.

The result of the multiplication step, a block-windowed transform image representation, is available over lines 106, is applied to a size Q inverse discrete Fourier transform (IDFT) circuitry 108. Circuitry 108 performs the inverse Fourier transform over each of the blocks defined by the variable k (Eq. 18). The fast Fourier transform can be employed to implement element 108. Because of the symmetry in the Fourier transform, half of the data points are redundant and need not be included in the coding process. Therefore, the results of the block Fourier transforms, an unquantized, inverse transform representation of the image, over lines 110, can be split in half (in either the X or Y spatial dimensions for a two-dimensional image) and one-half of the data discarded. This is provided by circuitry 112. The output of circuitry 112, available over lines 114, are quantized and encoded by circuitry 116. Quantization is achieved using a well known method wherein the number of bits assigned to a particular coefficient are based on the logarithm of the variance of that coefficient. The resulting quantized signal, a compacted digital representation of the image, is encoded for transmission, for example, over a data transmission channel 118.

Figure 3:
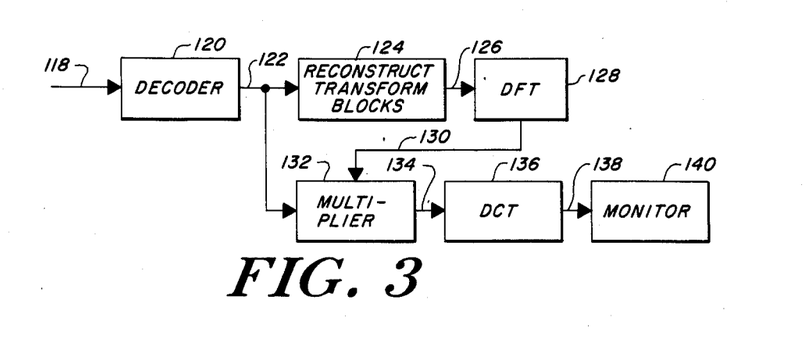
FIG. 3 is an electrical block diagram showing an inverse Short-Space Fourier transform image synthesizing apparatus in accordance with the invention.

Referring to FIG. 3, the signal over the data transmission channel 118 is received by a decoder 120 which decodes the incoming transmission signal and provides over lines 122 a received image representative signal corresponding to the signal over lines 114 at the transmitter location. The decoded received signal over lines 122 is employed by a reconstruction circuitry 124 for reconstructing the transform blocks and providing the reconstructed transform block signals over lines 126. The reconstructed signal is directed to a discrete Fourier transform circuitry 128, corresponding to the inverse of the operation performed by circuitry 108. Thus, the output of the discrete Fourier transform circuitry 128, over lines 130, is a received block-windowed image representation corresponding to the data over lines 106. The signal over lines 130 is multiplied by the inverse of the window function operation represented in Equation 18 by a multiplication circuitry 132. The multiplication circuitry also accommodates the phase wrap adjustment and the zero frequency coefficient scaling adjustment associated with the discrete cosine transform. The output of the multiplication circuitry 132, the received, discrete reflected transform image representation over lines 134 is subject to an inverse discrete cosine transform by a circuitry 136 for generating a received image representation over lines 138. Thereby, the image originally input to the transmitter over lines 44 from the camera 38 and A/D converter 40, can be displayed on a video display or other monitor 140.

In accordance with the preferred embodiment of the invention, a low frequency portion of the output of window multiplier 104 is not passed through the inverse discrete Fourier transform circuitry 108, but is applied instead directly to the quantizer and encoding element 116 over a line 144. In this manner, the low frequency data output of multiplier 104, which cannot effectively be further compacted, is transmitted directly; and further time-consuming operations on this data are not needlessly performed. A corresponding connection, a line 146, is provided in the receiver to connect the output of the decoder 122 directly to the receiver multiplier 132. In this manner the receiver corresponds to the construction of the transmitting circuitry.

An additional advantage to the frequency domain implementation of FIGS. 2 and 3 is that it is very simple to use a frequency dependent window; that is, for each frequency sample, which samples need not be uniformly spaced, a different window function can be used. This results because the transform is determined independently for each frequency sample. In particular, the coding apparatus of FIG. 2 can employ non-overlapping "rectangular bands" which are different sizes in different regions of the frequency spectrum. This is discussed in greater detail in section 6.2 of the Bernstein thesis. For example, if narrow bands are used for the low frequencies and wide bands are used for the high frequencies, the overall performance of the coding transmitter 42 of FIG. 2 can be improved. The implementation of the coding transmitter 42 is the same; however, the particular window multiplication of multiplier 104 (and correspondingly receiver multiplier 132) is modified to reflect the new effective window function.

For a practical application, the pictorial image can have 256×256 picture elements (pixels) sampled with 6 bits of data by A to D converter 40; and each "block" in the spatial domain can preferably have 16×16 pixels. A single frame can be communicated over, for example, a 56 kb/s data channel using the Short-Space Fourier transform at a rate corresponding to about 0.3 to 0.4 bits per pixel. The resulting image is degraded somewhat and has a SNR of about 22 dB. No "blocking effects"0 are present.

Figure 4:
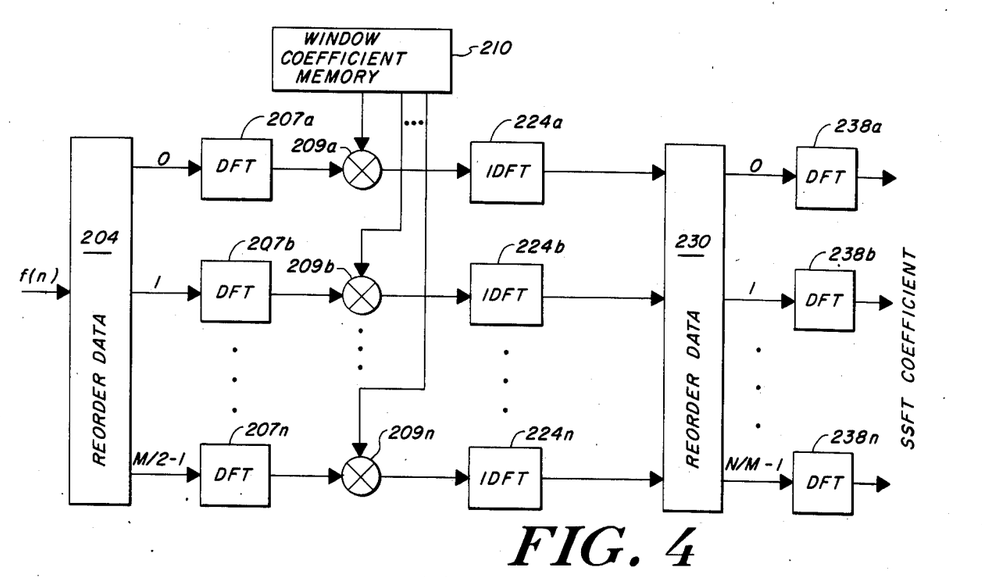
FIG. 4 is an implementation, in the spatial domain, of a one-dimensional, critically sampled, Short-Space Fourier transform using a symmetric window function.
Figure 5:
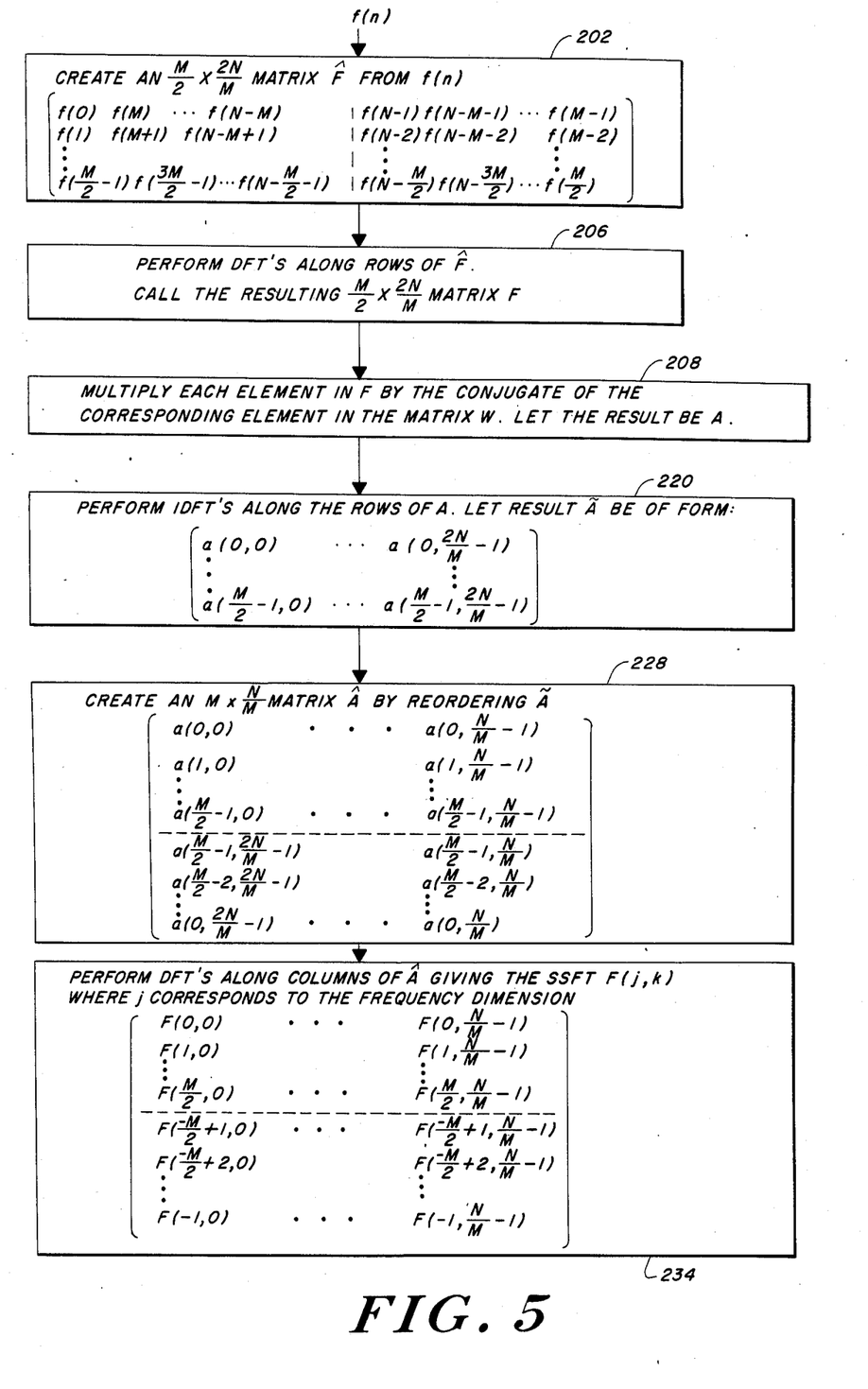
FIG. 5 is a flow chart for the one-dimensional, critically sampled, Short-Space Fourier transform implementation of FIG. 4, using a real, symmetric window function.

In a more general spatial domain implementation of the Short-Space Fourier transform, several constraints upon the transform yield a simple conceptual implementation, the supporting theory for which is presented in Section 5.1 of the Bernstein thesis. Referring to FIG. 4, and the corresponding flow chart of FIG. 5, the input signal f(n) is first reordered into an (M/2)×(2N/M) matrix $\hat{F}$ accordance with the construction of the flow diagram at 202 (FIG. 5). The reordering takes place in a reordering element 204 (FIG. 4). Thereafter, as noted at 206, the discrete Fourier transform along rows of $\hat{F}$ is taken, resulting in an (M/2)×(2N/M) matrix F. The discrete Fourier transform can be performed by separate hardware elements 207a, 207b, . . . , 207(n). Thereafter, each element of matrix F is multiplied by the conjugate of the corresponding element in a window coefficient matrix W. This is indicated at 208. The result is labelled "matrix A." The multiplications can be performed by multipliers 209a, 209b, . . . , 209(n). The multipliers receive inputs from the discrete Fourier transform hardware 207 and from a precalculated window coefficient memory 210.

Figure 6:
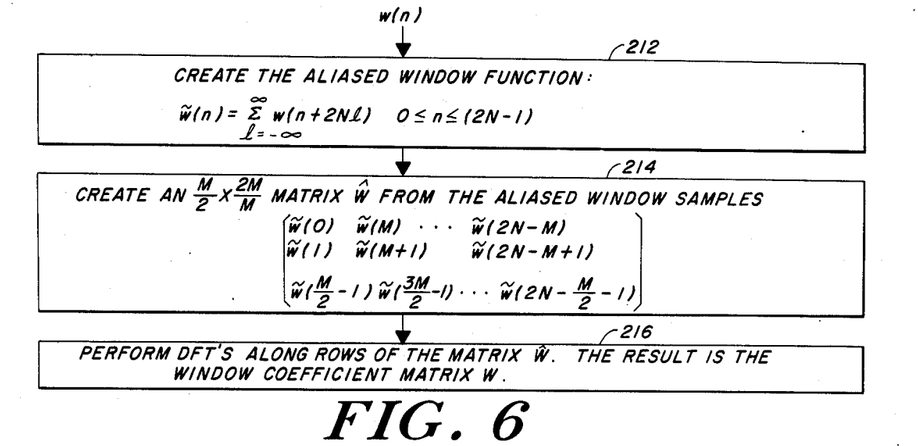
FIG. 6 is a flow diagram illustrating a method for determining the window coefficient matrix used in connection with the Short-Space Fourier transform implementation of FIG. 4.
Figure 7:
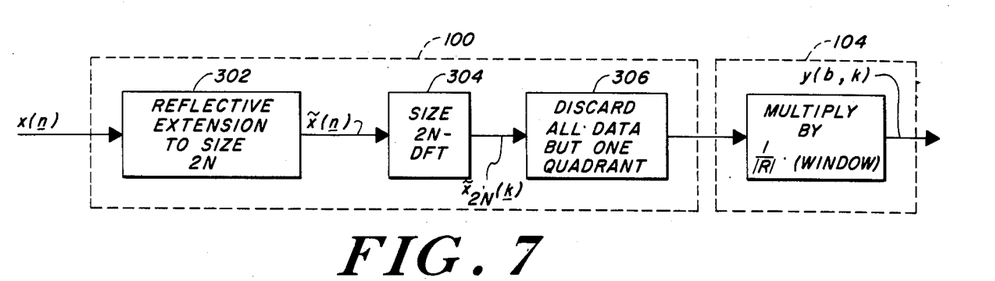
FIG. 7 is an electrical block diagram of a DFT implementation according to the invention.
Figure 8:
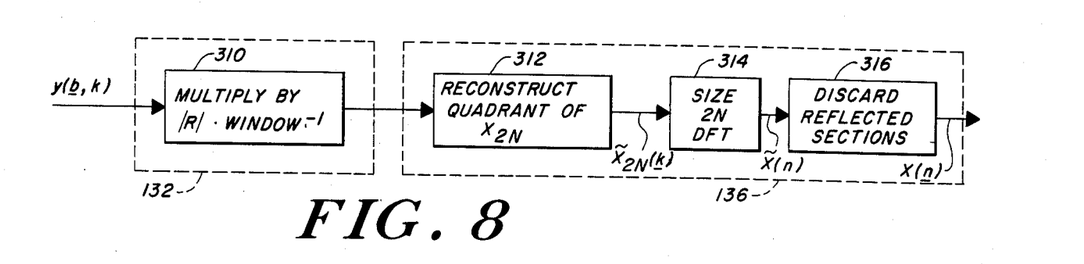
FIG. 8 is an electrical block diagram of an inverse DFT implementation according to the invention.
Figure 9:
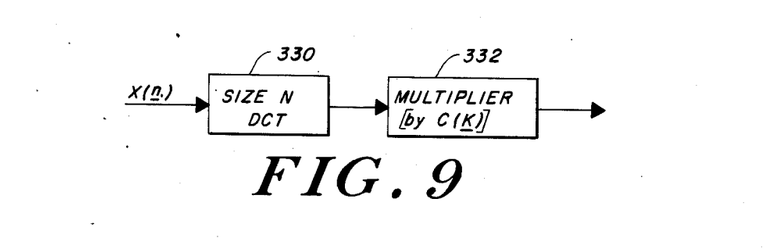
FIG. 9 is an electrical block diagram of a DCT implementation according to the invention.
Figure 10:
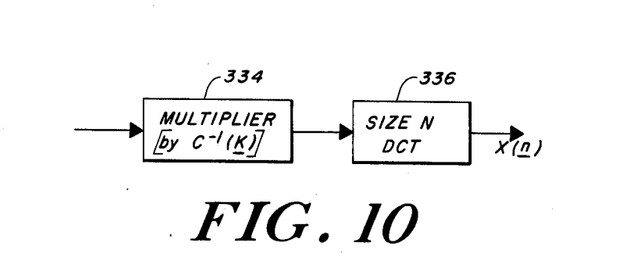
FIG. 10 is an electrical block diagram of an inverse DCT implementation according to the invention.

Referring to FIG. 6, the precalculated window memory is created by generating w(n) which is the aliased window function. This is indicated at 212. Thereafter an (M/2)×(2N/M) matrix $\hat{W}$ is created from the aliased window values as indicated at 214. Finally, the discrete Fourier transform is taken along rows of the matrix $\hat{W}$. The result is the window coefficient matrix $\tilde{W}$. This is indicated at 216. The coefficient component values of matrix W are stored in memory 210.

Referring again to FIG. 5, the inverse discrete Fourier transform is taken along rows of matrix A with the result, matrix $\bar{A}$ being of the form indicated at 220 of FIG. 5. The inverse Fourier transforms can be taken by inverse Fourier transform circuitries 224a, 224b, . . . , 224(n). The resulting matrix $\bar{A}$ is employed and reordered to create an M×(N/M) matrix $\bar{A}$ as shown at 228. The reordering is performed by a reordering circuitry 230.

Thereafter the discrete Fourier transforms are taken along columns of matrix A for providing the Short-Space Fourier transform F(j,k) where j corresponds to the frequency dimension. This is indicated at 234. The discrete Fourier transform circuit elements are shown in FIG. 4 at 238a, 238b, . . . , 238(n). There result the coefficients of the Short-Space Fourier transform.

This implementation depends only upon the window function being a real-valued, symmetric function, and the Short-Space Fourier transform being critically sampled. The particular embodiment of FIGS. 4, 5, and 6 is for a one-dimensional, critically sampled, Short-Space Fourier transform; however, the circuitry can be extended to a multi-dimensional signal as is well-known in the art. However, the calculation requirements for this implementation are clearly significantly greater than that for the frequency domain implementation using the particularly advantageous window transform which, in the spatial domain, is a sinc function and in the frequency domain appears to be an ideal filter. Clearly, however, for an arbitrary window function, the frequency domain approach can also become quite cumbersome and lengthy. This is described in greater detail in Section 5.2 of the Bernstein thesis.

In other embodiments of the invention, different window functions will be applicable and circuitry can be generated for the implementation of the Short-Space Fourier transform in accordance therewith. The Short-Space Fourier transform can also be implemented as a combination of hardware (for example using high speed array processors) and software or solely in software. In other embodiments of the invention, different programs and/or hardware can be employed for implementing the Short-Space Fourier transform.

Additions, subtractions, deletions, and other modifications of the disclosed preferred embodiment of the invention will be apparent to those skilled in the art and are within the scope of the following claims.

What is claimed is:

1. A method for representing a pictorial image comprising the steps of
   generating a digital representation of said image, and
   transforming said digital representation of said image, using a Short-Space Fourier transform having overlapping basis functions for generating a compacted digital representation of said image,
   wherein said compacted digital representation requires fewer bits of data than said digital representation for representing said image.

2. The method of claim 1 wherein said transforming step comprises the steps of
   effecting a discrete Fourier transform of a reflectively extended representation of said digital representation of said image for generating a discrete, reflected, transform image representation of said image,
   multiplying said discrete, reflected, transform image representation by a windowing function for generating a block-windowed transform image representation of said image,
   effecting an inverse discrete Fourier transform of said block-windowed transform image representation of said image for generating an unquantized, inverse transform representation of said image, and
   quantizing said inverse transform representation of the image for generating said compacted digital representation of said image.

3. The method of claim 2 wherein
   said first effecting step comprises the step of
      employing the discrete cosine transform operating on said digital representation for generating said discrete, reflected, transform image representation of said image, and
   said multiplying step comprises the steps of
      scaling a DC component of said multiplication by a factor for compensating for said discrete cosine transform, and
      adjusting the phase wrap of said multiplication for compensating for a phase shift requirement of the discrete cosine transform.

4. The method of claim 2 further comprising the step of
   discarding a half of said data forming said unquantized, inverse transform representation prior to said quanitizing step.

5. The method of claim 2 further comprising the step of
   selecting a low frequency component portion of said block-windowed transform image representation for direct application to and by said quantizing step.

6. The method of claim 1 further comprising the step of
   providing for said Short-Space Fourier transform, a window function of the general form (sin x)/x.

7. The method of claim 1 further comprising the step of providing for said Short-Space Fourier transform, a frequency-dependent window function.

8. The method of claim 7 further wherein said window function has non-overlapping rectangular bands of different sizes in different regions of the frequency spectrum.

9. The method of claim 1 further comprising the step of providing for said Short-Space Fourier Transform, a window function which, for a size 2 N discrete Fourier transform of the aliased window has the form:

$$\widetilde{W}(\underline{b}) = \begin{cases} \exp(\mathbf{i} j \underline{i}^T (\Gamma - \Psi)\underline{b}) & \underline{b} \epsilon D_Q \\ 0 & \text{otherwise.} \end{cases}$$

10. An apparatus for representing a pictorial image comprising means for transforming a digital representation of said image using a Short-Space Fourier transform having overlapping basis functions for generating a compacted digital representation of said image, wherein said compacted representation requires fewer bits of data than said digital representation for representing said image.

11. The apparatus of claim 10 wherein said transforming means comprises means for effecting a discrete Fourier transform of a reflectively extended representation of said digital representation of said image for generating a discrete, reflected, transform image representation of said image, means for multiplying said discrete, reflected, transform image representation by a windowing function for generating a block-windowed transform image representation of said image, means for effecting an inverse discrete Fourier transform of said block-windowed transform image representation of said image for generating an unquantized, inverse transform representation of said image, and means for quantizing said inverse transform representation of said image for generating said compacted representation of said image.

12. The apparatus of claim 11 wherein
said first effecting means comprises means for employing the discrete cosine transform operating on said digital representation for generating said discrete, reflected, transform image representation of said image, and said multiplying means comprises means for scaling a DC component of said multiplication by a factor for compensating for said discrete cosine transform, and means for adjusting the phase wrap of said multiplication for compensating for a phase shift requirement of the discrete cosine transform.

13. The apparatus of claim 12 further comprising means for discarding a half of said data forming said unquantized, inverse transform representation prior to said quanitizing means.

14. The apparatus of claim 11 further comprising means for selecting a low frequency component portion of said block-windowed transform image representation for direct application to and by said quantizing means.

15. The apparatus of claim 10 further comprising means for providing, for said Short-Space Fourier transform, a window function of the general form (sin x)/x.

16. The apparatus of claim 10 further comprising means for providing for said Short-Space Fourier transform, a frequency-dependent window function.

17. The apparatus of claim 10 further comprising means for providing for said Short-Space Fourier Transform, a window function which, for a size 2 N discrete Fourier transform of the aliased window has the form:

$$\widetilde{W}(\underline{b}) = \begin{cases} \exp(\mathbf{i} j \underline{i}^T (\Gamma - \Psi)\underline{b}) & \underline{b} \epsilon D_Q \\ 0 & \text{otherwise.} \end{cases}$$

18. A method for communicating an image representation over a data channel comprising the steps of digitizing said image for producing a digital representation of said image, transforming said digital representation using a Short-Space Fourier transform having overlapping basis functions for generating a compacted digital representation of said image, wherein said compacted representation requires fewer bits of data than said digital representation for representing said image, transmitting said compacted representation over said data channel, receiving said transmitted compacted representation at a receiver location, transforming said received image representation using an inverse Short-Space Fourier transform for generating a received inverse transform representation representative of said image, and displaying said received, inverse transform representation of said image.

19. The method of claim 18 wherein said digital representation transforming step comprises the steps of effecting a discrete Fourier transform of a reflectively extended representation of said digital representation of said image for generating a discrete, reflected, transform image representation of said image, multiplying said discrete, reflected, transform image representation by a windowing function for generating a block-windowed transform image representation of said image, effecting an inverse discrete Fourier transform of said block-windowed transform image representation of said image for generating an unquantized, inverse transform representation of said image, and quantizing said unquantized, inverse transform representation of said image for generating said compacted representation of said image.

20. The method of claim 18 wherein said received image representation transforming step comprises the steps of effecting a discrete Fourier transform of said received image representation for generating a received, block-windowed image representation of said image, multiplying said received, block-windowed image representation of said image by a synthesizing function for generating a received discrete, reflected transform image representation of said image, and effecting an inverse discrete Fourier transform of said received, discrete reflected transform representation for generating said received, inverse transform representative of said image.

21. The method of claim 20 wherein
said receiver inverse transform effecting step comprises the step of
employing an inverse discrete cosine transform operating on said received, reflected transform image representation of said image, and
said receiver multiplying step comprises the steps of
scaling a DC component of said multiplication by a factor for compensating for said inverse discrete cosine transform, and
adjusting the phase wrap of said receiver multiplication for compensating for phase shift associated with said inverse discrete cosine transform.

22. The method of claim 20 further comprising the step of
selecting from said received image representation, a low frequency component portion for direct application to and by said multiplication step.

23. The method of claim 18 further comprising the step of
reconstructing from said received image representation a previously discarded half of said received representation for delivery to said received image transforming step.

24. The method of claim 18 further comprising the step of
providing, for said Short-Space Fourier transform, a window function of the general form (sin x)/x.

25. The method of claim 18 further comprising the step of
providing for said Short-Space Fourier transform, a frequency-dependent window function.

26. The method of claim 25 further wherein said
window function has non-overlapping rectangular bands of different sizes in different regions of the frequency spectrum.

27. The method of claim 18 further comprising the step of
providing for said Short-Space Fourier Transform, a window function which, for a size 2 N discrete Fourier transform of the aliased window has the form:

$$\tilde{W}(\underline{b}) = \begin{cases} \exp(\tfrac{1}{2}j\,\underline{i}^T(\Gamma - \Psi)\underline{b}) & \underline{b} \in D_Q \\ 0 & \text{otherwise.} \end{cases}$$

28. An apparatus for communicating an image representation over a data channel comprising
means for digitizing said image for producing a digital representation of said image,
means for transforming said digital representation using a Short-Space Fourier transform having overlapping basis functions for generating a compacted digital representation of said image, wherein said compacted representation requires fewer bits of data than said digital representation for representing said image,
means for transmitting said compacted representation over said data channel,
means for receiving said transmitted compacted representation at a receiver location,
means for transforming said received image representation using an inverse Short-Space Fourier transform for generating a received inverse transform representation representative of said image, and
means for displaying said received, inverse transform representation of said image.

29. The apparatus of claim 28 wherein said digital representation transforming means comprises
means for effecting a discrete Fourier transform of a reflectively extended representation of said digital representation of said image for generating a discrete, reflected, transform image representation of said image,
means for multiplying said discrete, reflected, transform image representation by a windowing function for generating a block-windowed transform image representation of said image,
means for effecting an inverse discrete Fourier transform of said block-windowed transform image representation of said image for generating an unquantized, inverse transform representation of said image, and
means for quantizing said unquantized, inverse transform representation of said image for generating said compacted representation of said image.

30. The apparatus of claim 28 wherein said received image representation transforming means comprises
means for effecting a discrete Fourier transform of said received image representation for generating a received, block-windowed image representation of said image,
means for multiplying said received, block-windowed image representation of said image by a synthesizing function for generating a received discrete, reflected transform image representation of said image, and
means for effecting an inverse discrete Fourier transform of said received, discrete reflected transform image representation for generating said received, inverse transform representative of said image.

31. The apparatus of claim 30 wherein
said receiver inverse transform effecting means comprises
means for employing an inverse discrete cosine transform operating on said received, reflected transform image representation of said image, and
said receiver multiplying means comprises
means for scaling a DC component of said multiplication by a factor for compensating for said inverse discrete cosine transform, and
means for adjusting the phase wrap of said receiver multiplication means for compensating for phase shift associated with said inverse discrete cosine transform.

32. The apparatus of claim 30 further comprising
means for selecting from said received image representation, a low frequency component portion for direct application to and by said multiplication means.

33. The apparatus of claim 28 further comprising
means for reconstructing from said received image representation a previously discarded half of said received representation for delivery to said received image transforming means.

34. The apparatus of claim 28 further comprising
means for providing, for said Short-Space Fourier transform, a window function of the general form (sin x)/x.

35. The apparatus of claim 28 further comprising means for providing for said Short-Space Fourier transform, a frequency-dependent window function.

36. The apparatus of claim 28 further comprising means for providing for said Short-Space Fourier Transform, a window function which, for a size 2 N discrete Fourier transform of the aliased window has the form:

$$\tilde{W}(\underline{b}) = \begin{cases} \exp(\tfrac{1}{2}j\,\underline{i}^T(\Gamma - \Psi)\underline{b}) & \underline{b} \in D_Q \\ 0 & \text{otherwise.} \end{cases}$$

37. A method for representing a multi-dimensional, finite extent, information containing signal in a locally sensitive, frequency domain representation comprising the steps of
   generating a digital representation of said information, and
   transforming said digital representation of said information containing signal using a Short-Space Fourier transform having overlapping basis functions.

38. The method of claim 37 wherein said transforming step comprises the steps of
   critically sampling said information containing signal, and
   selecting a window function for use in said Short-Space Fourier transform for which a synthesis function can be generated.

39. The method of claim 37 further comprising the step of
   providing for said Short-Space Fourier transform, a frequency-dependent window function.

40. The method of claim 37 further comprising the step of
   providing for said Short-Space Fourier Transform, a window function which, for a size 2 N discrete Fourier transform of the aliased window has the form:

$$\tilde{W}(\underline{b}) = \begin{cases} \exp(\tfrac{1}{2}j\,\underline{i}^T(\Gamma - \Psi)\underline{b}) & \underline{b} \in D_Q \\ 0 & \text{otherwise.} \end{cases}$$

* * * * *

UNITED STATES PATENT AND TRADEMARK OFFICE
CERTIFICATE OF CORRECTION

PATENT NO. : 4,703,349

DATED : October 27, 1987

INVENTOR(S) : Jeffrey G. Bernstein

Page 1 of 3

It is certified that error appears in the above-identified patent and that said Letters Patent is hereby corrected as shown below:

Column 2, line 25: "Varous" should read --Various--.

Column 6, (Equation 7): $"\tilde{w}(\underline{n}) = \sum_{\underline{b} \varepsilon D_x} w(\underline{n} - 2N\underline{b})"$ should read $--\tilde{w}(\underline{n}) = \sum_{\underline{b} \varepsilon D_\infty} w(\underline{n} - 2N\underline{b})--.$ Column 6, (Equation 8): $"\tilde{f}(\underline{n}) = \sum_{\underline{b} \varepsilon D_x} f(\underline{n} - 2N\underline{b})"$ should read $--\tilde{f}(\underline{n}) = \sum_{\underline{b} \varepsilon D_\infty} f(\underline{n} - 2N\underline{b})--.$ Column 6, line 67: "x" should read --$\tilde{x}$--.

UNITED STATES PATENT AND TRADEMARK OFFICE
CERTIFICATE OF CORRECTION

PATENT NO. : 4,703,349

DATED : October 27, 1987

INVENTOR(S) : Jeffrey G. Bernstein

Page 2 of 3

It is certified that error appears in the above-identified patent and that said Letters Patent is hereby corrected as shown below:

Column 7, (Equation 10):

"$$R = \begin{bmatrix} R_1 & & & O \\ & R_2 & & \\ & & & \\ O & & & R_D \end{bmatrix}$$" should read $$R = \begin{bmatrix} R_1 & & & O \\ & R_2 & & \\ & & \ddots & \\ O & & & N_D \end{bmatrix}$$--.

Column 7, (Equation 11):

"$$\Omega = \begin{bmatrix} \Omega_1 & & & O \\ & \Omega_2 & & \\ & & & \\ O & & & \Omega_D \end{bmatrix}$$" should read $$\Omega = \begin{bmatrix} \Omega_1 & & & O \\ & \Omega_2 & & \\ & & \ddots & \\ O & & & \Omega_D \end{bmatrix}$$--.

Column 7, (Equation 12):

"$$N = \begin{bmatrix} N_1 & & & O \\ & N_2 & & \\ & & & \\ O & & & N_D \end{bmatrix}$$" should read $$N = \begin{bmatrix} N_1 & & & O \\ & N_2 & & \\ & & \ddots & \\ O & & & N_D \end{bmatrix}$$--.

UNITED STATES PATENT AND TRADEMARK OFFICE
CERTIFICATE OF CORRECTION

PATENT NO. : 4,703,349

DATED : October 27, 1987

INVENTOR(S) : Jeffrey G. Bernstein

It is certified that error appears in the above-identified patent and that said Letters Patent is hereby corrected as shown below:

Column 7, line 35: "$D_\infty$ = all $\underline{n}$ such that $-\infty \underline{\leq} n_i \underline{\leq} +\infty$ for all $\underline{i}$ and" should read --$D_\infty$ = all $\underline{n}$ such that $-\infty < n_i < +\infty$ for all $\underline{i}$ and--.

Column 11, line 26: "matrix W" should read --matrix $\hat{W}$--.

Column 11, line 27: "matrix $\hat{W}$" should read --matrix W--.

Column 11, line 30: "matrix A" should read --matrix $\tilde{A}$--.

Signed and Sealed this

Twenty-eighth Day of March, 1989

Attest:

DONALD J. QUIGG

Attesting Officer

Commissioner of Patents and Trademarks